United States Patent [19]
Makino et al.
[11] Patent Number: 4,798,920
[45] Date of Patent: Jan. 17, 1989

[54] STYLUS COORDINATE DETERMINING DEVICE WITH DISTORTION COMPENSATION

[75] Inventors: Toshiyuki Makino; Tsuyoshi Yamaguchi, both of Kanagawa, Japan

[73] Assignee: Hitachi Seiko, Ltd., Kanagawa, Japan

[21] Appl. No.: 23,926

[22] Filed: Mar. 9, 1987

Related U.S. Application Data

[63] Continuation of Ser. No. 773,199, Sep. 6, 1985, abandoned.

[51] Int. Cl.⁴ ........................ G01B 7/14; G01N 27/72; G01R 33/00; G08C 21/00

[52] U.S. Cl. ........................ 178/19; 324/208; 324/225

[58] Field of Search ........................ 324/207, 208, 225; 178/18, 19, 20; 382/3

[56] References Cited

U.S. PATENT DOCUMENTS 4,029,899 6/1977 Gordon ........................ 178/19
4,322,683 3/1982 Vieira et al. ........................ 324/225
4,477,877 10/1984 Nakamura et al. ........................ 178/19

FOREIGN PATENT DOCUMENTS 0043678 3/1980 Japan ........................ 178/19

*Primary Examiner*—Reinhard J. Eisenzopf
*Assistant Examiner*—Walter E. Snow
*Attorney, Agent, or Firm*—Finnegan, Henderson, Farabow, Garrett, & Dunner

[57] ABSTRACT

In a coordinates detecting device comprising: a cursor; a tablet in which conductors are arranged in a predetermined periodic pattern; and arithmetic means for calculating the position of the cursor according to the outputs of the tablet, correction values for correcting the errors which are caused in common with all the periods of the pattern and in correspondence to the positions in each of the periods have been stored in memory, and the position of the cursor calculated by the arithmetic means is corrected by using the respective correction value.

2 Claims, 4 Drawing Sheets

STYLUS COORDINATE DETERMINING DEVICE WITH DISTORTION COMPENSATION

This application is a continuation of application Ser. No. 773,199, filed Sept. 6, 1985, now abandoned.

BACKGROUND OF THE INVENTION

This invention relates to a coordinates detecting device for detecting the position of a pen, cursor or the like on a tablet.

A coordinates detecting device comprises: an electromagnetic device such as a pen, cursor, or the like; means for supplying a sine wave voltage having a predetermined frequency to the electromagnetic device; a tablet in which X-axis conductors and Y-axis conductors are arranged in a periodic pattern; and an arithmetic and control section for processing signals which are provided by the conductors when the electromagnetic device is placed on the tablet, to calculate the position of the electromagnetic device.

The coordinates detecting device will be described with reference to FIG. 1.

FIG. 1 is a block diagram of the coordinates detecting device. In FIG. 1, reference numeral 1 designates a sine wave generating circuit for generating a sine wave having a predetermined frequency; 2, an amplifier for amplifying the sine wave voltage of the sine wave generating circuit 1; 3, a cursor having a resistor 3R and a coil 3L; 4, a tablet in which conductors such as X-axis conductors and Y-axis conductors are arranged in a predetermined pattern; and 5, an arithmetic and control section for processing a signal which is outputted by the tablet 4 when the cursor 3 is placed on the tablet 4.

The conductors arranged in the tablet and their output voltages will be described.

FIG. 2A is a wiring diagram of the X-axis conductors in the tablet, and FIGS. 2B and 2C are waveform diagrams showing voltages inducted in the conductors. FIG. 2 is for the X-axis conductors only. The X-axis conductors as shown in FIG. 2A are made up of a cosine line 6 and a sine line 7. The cosine line 6 and the sine line 7 are equal in the pitch of one period (having a pitch p) and are arranged in such a manner that the sine line 7 is shifted as much as a $\frac{1}{4}$ p from the cosime line 6. The ends of the cosine line 6 are connected to terminals $a_1$ and $a_2$, and the ends of the sine line 7 are connected to terminals $b_1$ and $b_2$. FIGS. 2B and 2C show the voltages which are developed when the cursor 3 is placed on the tablet as shown in FIG. 1. More specifically, FIG. 2B shows the waveform of the voltage Vc which is developed across the terminals $a_1$ and $a_2$ of the cosine line 6, and FIG. 2C shows the waveform of the voltage Vs which is developed across the terminals $b_1$ and $b_2$ of the sine line 7. These voltages are applied to the arithmetic and control section, where they are subjected to arithmetic processing, so that the abscissa of the cursor 3 is calculated. The operation and control for the calculation are carried out in a conventional manner.

In the above-described coordinates detecting device, the arithmetic and control section 5 may perform the arithmetic processing correctly; however, the detection values unavoidably include errors. In order to eliminate this difficulty, heretofore a method is employed in which the accuracies at a number of positions on the entire surface of the tablet are actually measured, and detection values are corrected according to the accuracies thus measured. However, the method is still disadvantageous in that, if the number of positions to be measured is increased, the number of correction data is increased, and if the number of positions to be measured is decreased, the detection accuracy is decreased.

SUMMARY OF THE INVENTION

Accordingly, an object of this invention is to provide a coordinates detecting device in which the abovedescribed difficulties accompanying a conventional coordinates detecting device are eliminated, and with a relatively small number of correction data, the error is decreased so that the detection accuracy is improved.

The foregoing object and other objects of the invention have been achieved by the provision of a coordinates detecting device comprising: an exciting device which is excited at a predetermined oscillating frequency; a tablet in which conductors are arranged in a predetermined periodic pattern to provide outputs according to the position of the exciting device; and arithmetic means for calculating the position of the exciting device according to the outputs of the tablet, which, according to the invention, comprises: a memory section for storing correction values to correct errors which are in common with all the periods of the pattern and occur in correspondence to positions in each of the periods; and correcting means for correcting the position of the exciting device calculated by the arithmetic means by using the respective one of the correction value stored in the memory section.

The nature, principle and utility of the invention will become more apparent from the following detailed description when read in conjunction with the accompanying drawings.

DETAILED DESCRIPTION OF THE PREFERRED EMBODIMENTS

Figure 3:
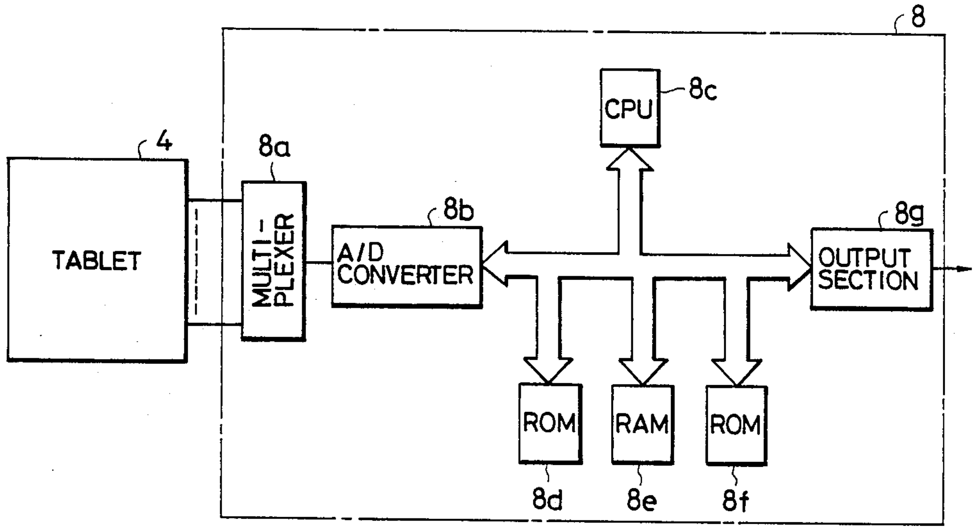
FIG. 3 is a block diagram showing an arithmetic and control section in one example of a coordinates detecting device according to this invention.

FIG. 3 is a block diagram showing an arithmetic and control section of one example of a coordinates detection device according to this invention.

Figure 1:
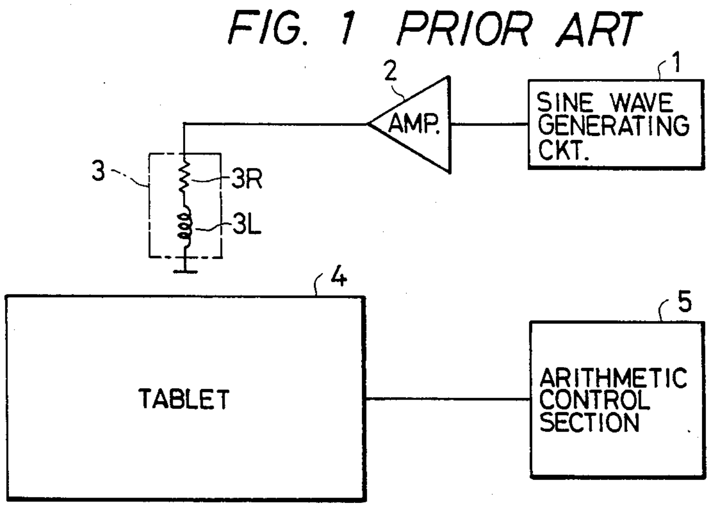
FIG. 1 is a block diagram showing a conventional coordinates detecting device.

In FIG. 3, reference numeral 4 designates a tablet which is the same as that in FIG. 1 and reference numeral 8 designates the arithmetic and control section. The arithmetic and control section 8 comprises: a multiplexer 8_a_ for successively inputting signals produced by the conductors of the tablet 4; an A/D (analog-to-digital) converter 8_b_ for converting the signals thus inputted into digital values; a CPU (central processing unit) 8c for performing arithmetic operations and control as required; a ROM (read-only memory) 8d in which the processing procedures of the CPU 8c have been stored; a RAM (random access memory) 8e for temporarily storing inputted values and arithmetic results; a ROMA 8f in which correction values have been stored; and an output section 8g for outputting calculated values. A value outputted by the output section is applied to a display unit and a recording device.

Figure 2A:
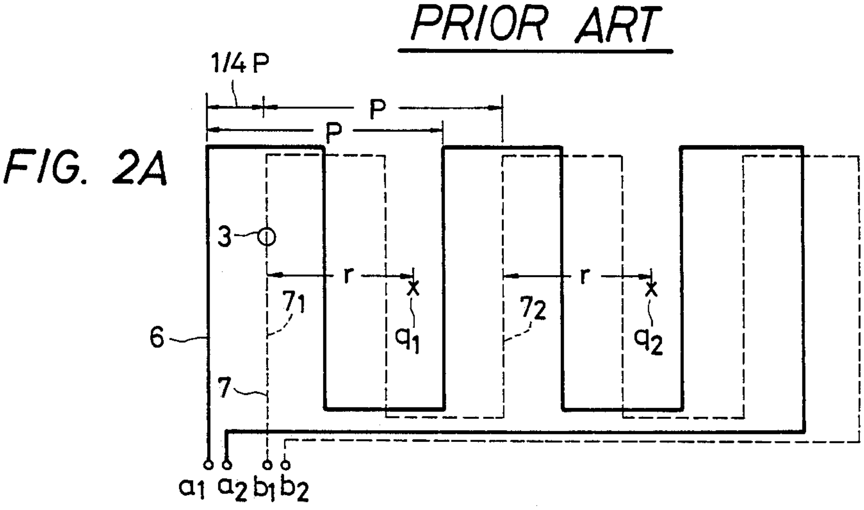
FIG. 2A is a diagram showing the arrangement of conductors in the tablet of the coordinates detecting device.
Figure 2B:
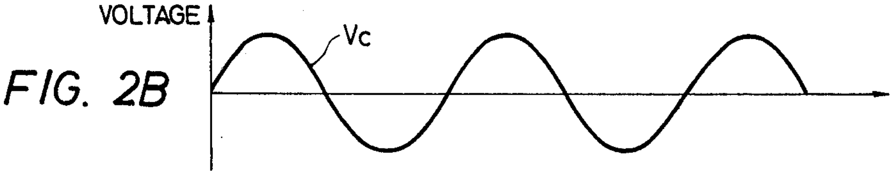
FIGS. 2B and 2C are waveform diagrams showing voltages developed in the conductors of the tablet.
Figure 2C:
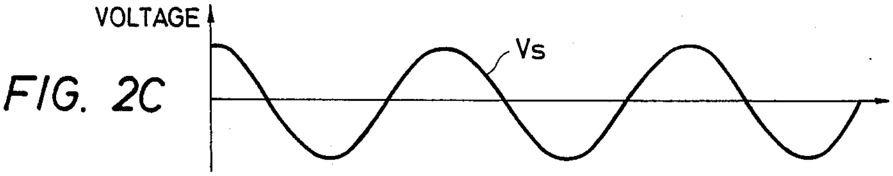

Now, the correction values stored in the ROM 8f will be described. In general, it is considered that errors with a coordinates detecting device attribute to the fact that, as the cursor 3 is electromagnetically coupled to the conductors in the tablet 4, the output waveform of each conductor is distorted by including triangular waveforms or trapezoid waveforms instead of the ideal sine wave shown FIGS. 2B and 2C. In this connection, it can be considered that the waveform distortion depends on how the cursor 3 is electromagnetically coupled to the conductors; that is, the distortion depends on the positional relationship between the cursor 3 and the conductors. Since the waveform distortion is determined from the positional relationship between the cursor 3 and the conductor, in each conductor the waveform distortion caused when the cursor 3 is placed at a position in a period should be the same as the waveform distortion which is caused when the cursor 3 is placed at the corresponding position in another period. This will be described with reference to the part (a) of FIG. 2. In the case where the cursor 3 is placed at a point $q_1$ (in the first period) at a distance r from a conductor part $7_1$ where the first period of the sine line 7 starts, and in the case where the cursor 3 is placed at a point $q_2$ at the same distance r from a conductor part $7_2$ where the second period of the sine line 7 starts, the waveform of the voltage developed across the terminals $a_1$ and $a_2$ of the cosine line 6 and the waveform of the voltage developed across the terminals $b_1$ and $b_2$ of the sine line 7 should be the same, being the same in distortion. Therefore, errors due to the distortions in the waveforms of the voltages produced at the corresponding positions (the points $q_1$ and $q_2$ in the above-described case) in the period of the conductor are the same. This can be confirmed not only theoretically but also experimentally.

Figure 4:
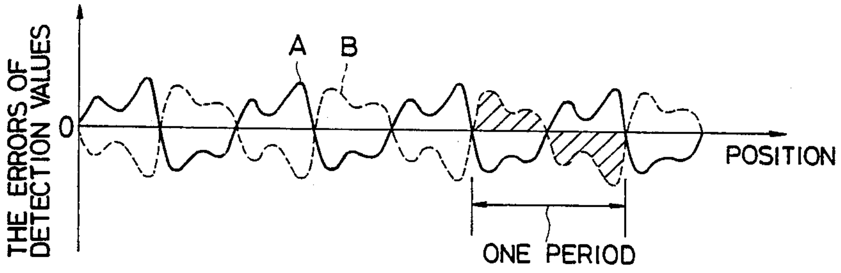
FIG. 4 is a waveform diagram of detection errors.

FIG. 4 is a waveform diagram showing detection errors. In FIG. 4, the horizontal axis represents positions on one and the same axis of the tablet, and the vertical axis represents detection value errors. In FIG. 4, the solid line curve A indicates errors at various positions, and the dotted-line curve B indicates corrections data. The curves A and B are symmetrical with respect to the horizontal axis. Therefore, if, for each position, correction is carried out according to the curve B, then the errors due to the voltage waveform distortion can be substantially eliminated. As is apparent from FIG. 4, the same magnitudes of errors are occur for all the periods, and accordingly the same errors occur at the corresponding positions in the different periods. Therefore, the correction data are the same for the corresponding positions in the different periods.

Accordingly, if the correction data for one period are stored in the ROM 8f in FIG. 3, then the detection value errors at all the positions can be corrected. The correction data stored in the ROM 8f are indicated by the shaded part in FIG. 4.

Figure 5:
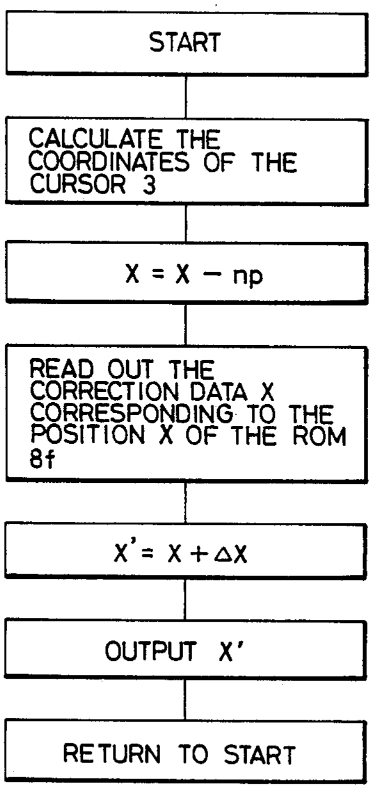
FIG. 5 is a flow chart showing the operation of the arithmetic and control section in FIG. 1.

The operation of the coordinates detecting device will be described with reference to a flow chart in FIG. 5.

When the cursor 3 is placed at a position on the tablet 4, the conductors arranged in the tablet 4 provide voltages according to their positions. The voltages thus provided are applied through the multiplexer 8a and the A/D converter 8b to the CPU 8c. The CPU 8c performs predetermined arithmetic operations to calculate the coordinates of the cursor 3 (the first Step $S_1$). The flow chart in FIG. 5 is for the abscissa only, and the coordinate value calculated in the flow chart is X. A value $n \times p$ (where n is the number of periods (other than the last period) included in the value X, and p is the pitch of the period) is subtracted from the value X, to obtain a position x in the last period in the value X (Step $S_2$). Then, the correction data $\Delta x$ corresponding to the position x thus obtained is read out of the ROM of (Step $S_3$) and is added to the value X to correct the latter X, i.e., to obtain a value X' (Step $S_4$). Thus, the error due to the voltage waveform distortion has been substantially eliminated, and the coordinate value can be obtained with higher accuracy. The value X' thus calculated is outputted to an external device through the output section 8g (Step $S_5$).

It is unnecessary to store the correction data in the ROM separately provided; that is, the correction data may be stored in the ROM in which the processing procedures of the CPU have been stored.

As is apparent from the above description, in the coordinates detecting device of the invention, the correction data for the detection erros due to the voltage waveform distortion have been stored in correspondence to the positions in one period of the conductors, after a coordinate value has been detected through predetermined arithmetic operations the position of. The coordinate value in the last period is obtained, and the correction data corresponding to the position thus obtained is detected as to correct the coordinate value. Accordingly, with an extremely small number of correction data, the errors of coordinate values can be reduced, and the detection accuracy can be remarkably improved.

Figure 6:
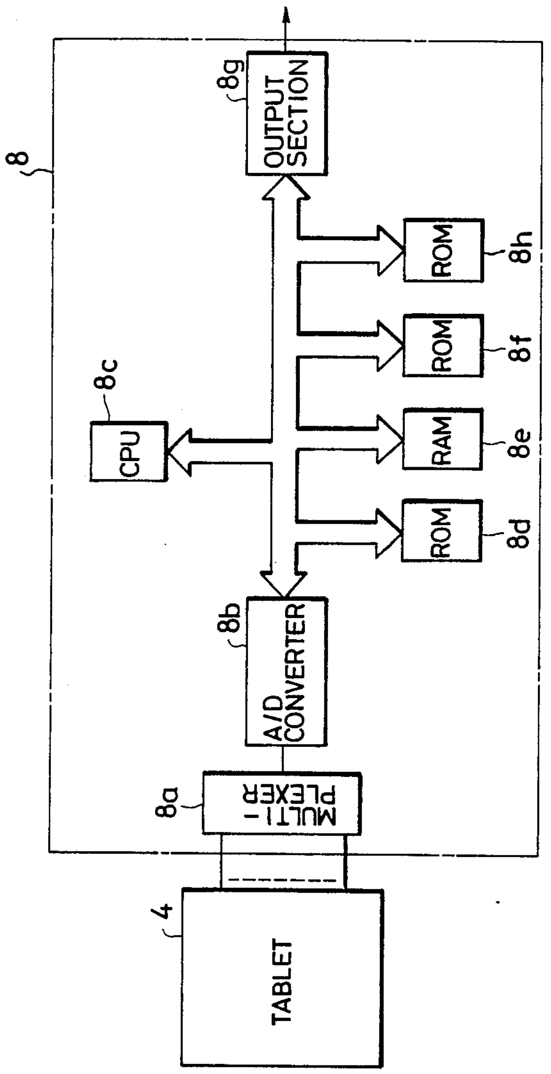
FIG. 6 is a block diagram showing an arithmetic and control section in another example of the coordinates detecting device according to the invention.

FIG. 6 is a block diagram showing an arithmetic and control section in a second example of the coordinates detecting device according to the invention. In FIG. 6, those components which have been described with reference to FIG. 3 are designated by the same reference numerals or characters. The second example of the coordinate detecting device is different from the first example in FIG. 3 in that it has a ROM 8h in which other correction data have been stored. The correction data stored in the ROM 8h will be described.

In the first example of the coordinates detecting device, only the error due to the distortion in voltage waveform which is caused when the cursor is electromagnetically coupled to the conductors, is taken into account. However, in a coordinates detecting device, an error due to the following phenomenon cannot be disregarded, although it is smaller than the above-described error. In the case where the tablet 4 is machined at a relatively low temperature and the coordinates detecting device is operated at a relatively high temperature or in the case where the tablet is formed at a relatively high temperature and the device is used at a relatively low temperature, the dimensions of the tablet are different from those which were given to the tablet when it was manufactured, as a result of which the detection value includes an error. Such an error may be caused not only by the difference between the manufacturing temperature and the operating temperature but also by a difference in humidity. It goes without saying that, as the distance between the detection position and the origin of the tablet 4 is increased, the error is substantially proportionally increased.

Figure 7:
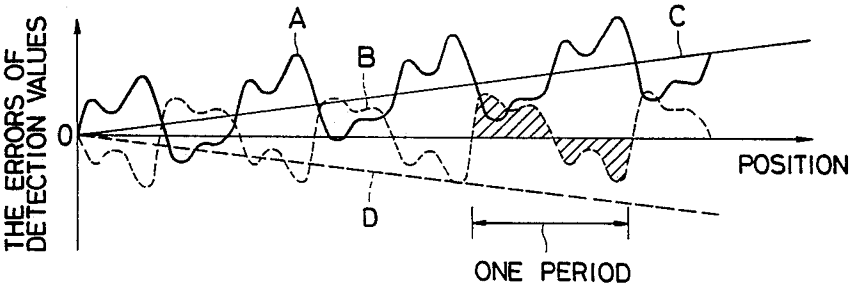
FIG. 7 is a waveform diagram of detection errors including errors due to the expansion or contraction of a tablet in the device.

FIG. 7 is a waveform diagram showing detection errors including errors due to the expansion and contraction of the tablet. In FIG. 7, the horizontal axis represents positions on one and the same axis on the tablet, and the vertical axis represents the errors of detection values. In FIG. 7, curves A and B are the same as the curves A and B in FIG. 2, and a straight line C indicates errors due to the expansion and contraction of the tablet. In order to further an understanding of this embodiment of the invention, the gradient of the straight line C is exaggerated. The periodic error due to the voltage waveform distortion described in the first example of the coordinates detecting device appears with the straight line C with an axis. In order to eliminate the error, correction should be carried out by using the correction data which are provided by a straight line D (indicated by the broken line) which is symmetrical with the straight line C with respect to the horizontal axis.

The straight line C has been obtained by performing measurement at certain intervals under the same conditions as those provided when or where the coordinates detecting device is used. The straight line D is formed according to the straight line C thus obtained, and values according to the gradient of the straight line D are stored, as correction data, in the ROM 8*h*. The storage of the correction data in the ROM 8*h* is achieved as follows: A predetermined coefficient k (for instance 0.1 mm/m) is provided in advance, and a multiplier m (the gradient of the straight line D) with respect to the coefficient k is inputted in the form of a digital value by using an external input device (such as a digital switch).

The operation of the second example of the coordinates detecting device will be described.

The position of the cursor 3 placed on the tablet 4 is calculated through predetermined arithmetic operation similarly as in Step $S_1$ shown in FIG. 3. With respect to the value X thus calculated, correction of the expansion and contraction error of the tablet is carried out. That is, the correction data (k×m) is read out of the ROM 8*h*, and the CPU 8*c* performs the following arithmetic operation:

$$X' = X(1 + k \times m)$$

Thus, the error due to the expansion or contraction of the table has been corrected. As a result, the straight line C coincides the horizontal axis, and the deviation of pitch in one period due to the gradient is eliminated. Thereafter, the value X' thus obtained is processed according to Steps $S_2$, $S_3$ and $S_4$ shown in FIG. 5. Thus, the coordinate value can be outputted in which the error due to the expansion or contraction of the tablet and the error due to the voltage waveform distortion have been eliminated.

If the ROM 8*d* or 8*f* is a rewritable one, the correction data (k×m) can be stored in it. In this case, the ROM 8*h* can be eliminated.

In the above-described second example of the coordinates detecting device, the correction data for detection errors due to voltage waveform distortion and the correction data for detection errors due to the expansion or contraction of the tablet are stored in memory, and are used to correct the coordinate values which are obtained through the predetermined arithmetic operations. Therefore, with a considerably small number of correction data, the errors of the coordinates can be more accurately eliminated, and the detection accuracy can be remarkably improved.

As is apparent from the above description, in the coordinates detecting device of the invention, the correction data for errors due to the distortion in waveform of voltages which are induced in the conductors arranged in the tablet are stored in memory in correspondence to the positions of the conductors in one period, and the coordinate values obtained through the predetermined arithmetic operations are corrected by using the correction data thus stored. Therefore, with a small number of correction data, the errors of coordinates detected can be eliminated, and the detection values outputted by the coordinates detecting device of the invention is considerably high in accuracy.

What is claimed is:

1. A stylus coordinate determining device comprising:

a tablet having a periodic pattern of conductors arranged thereon;

an exciting device adapted to be moved across a surface of said table and to be electromagnetically coupled to said conductors;

generator means for exciting said exciting device with a periodic waveform to generate a periodic output signal as said exciting device is moved on said surface of said tablet, said periodic output signal including a periodic distortion component having a magnitude dependent on the positional relationship on the tablet surface between the exciting device and the periodic pattern of conductors;

means for digitizing said periodic output signal to produce a periodic digital signal;

memory means for storing a periodic distortion compensation signal corresponding to said distortion component for each period of said periodic signal; and arithmetic means for arithmetically combining said periodic digital signal and said periodic distortion compensation signal to produce a compensated output signal free from said periodic distortion component caused by the positional relationship on the tablet surface between said exciting device and said periodic pattern of conductors.

2. A coordinate detecting device comprising:

a tablet having a periodic pattern of conductors arranged thereon;

an exciting device adapted to be moved across a surface of said tablet and to be electromagnetically coupled to said conductors;

generator means for exciting said exciting device with a periodic waveform to generate a periodic output signal as said exciting device is moved on said surface of said tablet, said periodic output signal including a first distortion component having a magnitude dependent upon the positional relationship between the exciting device and the conductors and being the same for each period of said periodic output signal and a second distortion component having a magnitude dependent on the positional relationship between the exciting device and an origin position on said tablet;

means for digitizing said periodic output signal to produce a periodic digital signal;

memory means for storing a first distortion compensation signal corresponding to said first distortion component present in each period of said periodic output signal and a second distortion compensation signal corresponding to said second distortion component corresponding to the positional relationship of said exciting device and said origin position; and arithmetic means for arithmetically combining said periodic digital signal and said first and second distortion compensation signals to produce a compensated output signal free from said first distortion component caused by the positional relationship between said exciting device and said conductors and said second distortion component proportional to the positional relationship between said exciting device and said origin position.

* * * * *